UNITED STATES PATENT OFFICE.

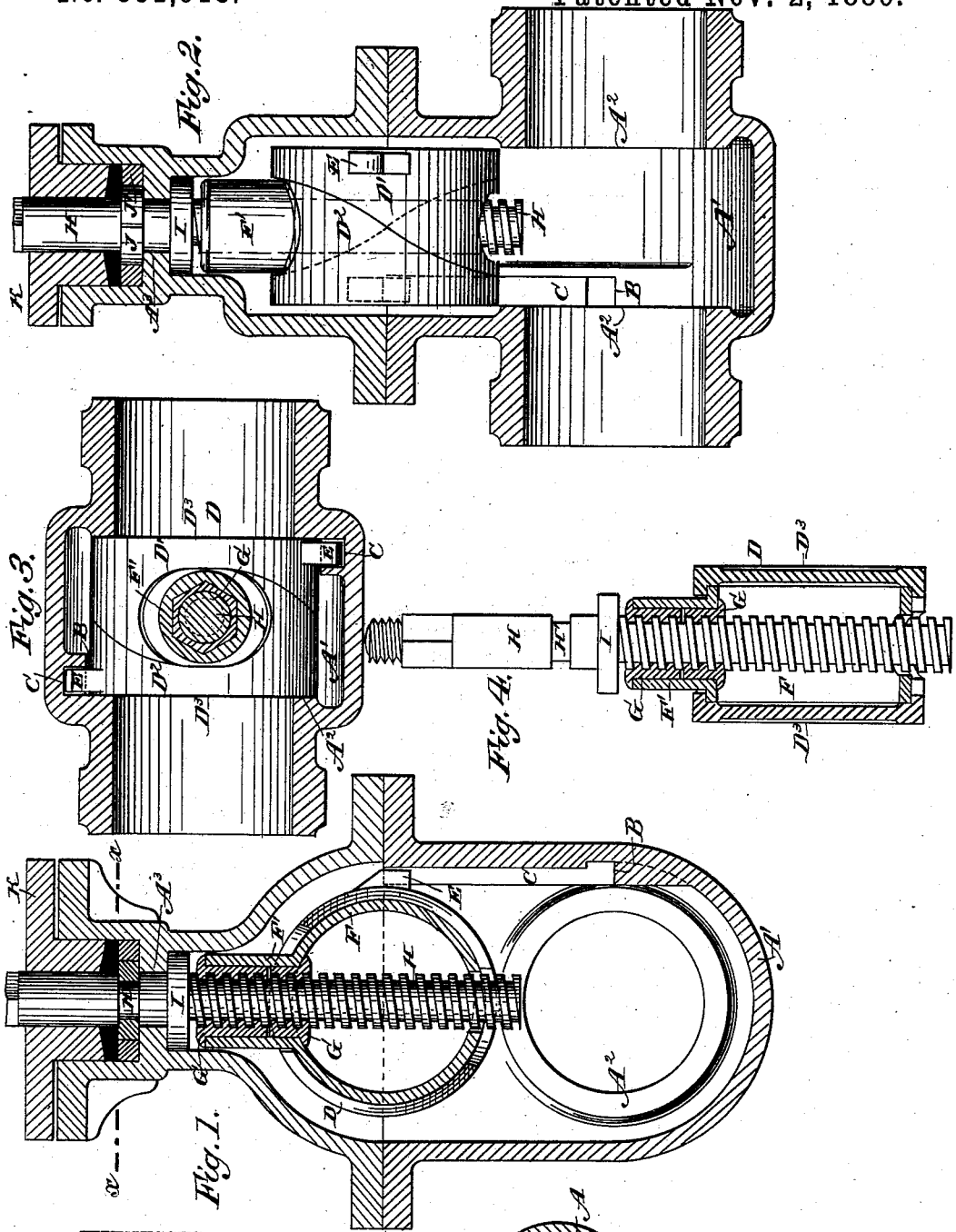

WILLIAM JACKSON, OF ALLEGHENY CITY, PENNSYLVANIA, ASSIGNOR TO THE SPECIALTY MANUFACTURING COMPANY, (LIMITED,) OF SAME PLACE.

GATE-VALVE.

SPECIFICATION forming part of Letters Patent No. 351,918, dated November 2, 1886.

Application filed March 15, 1886. Serial No. 195,272. (No model.)

*To all whom it may concern:*

Be it known that I, WILLIAM JACKSON, of Allegheny City, in the county of Allegheny and State of Pennsylvania, have invented a new and Improved Gate-Valve, of which the following is a full, clear, and exact description.

The object of my invention is to provide a new and improved gate-valve in which the gate, when closing, seats itself automatically and firmly.

The invention consists of the combination, with a valve body or casing having guiding-recesses and lugs at the bottoms of said recesses and a screw-stem seated for rotation in said body or casing, of the two-part gate, consisting of two rings which are provided on their inner edges with a double screw-thread-like curve, and each having a lug moving in a recess of the valve body or casing, the nut-ring fitting within said gate-rings and having an angular collar, within which is fitted a nut working upon said screw, whereby, upon the lugs of the valve-rings reaching the lugs at the bottoms of the recesses of the valve body or casing, and by continued movement of the screw or stem, the valve-rings will be revolved apart, and their faces thus packed tightly against their seats, substantially as hereinafter more fully set forth, and pointed out in the claim.

Reference is to be had to the accompanying drawings, forming a part of this specification, in which similar letters of reference indicate corresponding parts in all the figures.

Figure 1 is a central sectional elevation of my improvement. Fig. 2 is a sectional side elevation of the same. Fig. 3 is a sectional plan view of the same, showing the valve closed. Fig. 4 is a sectional side elevation of the disks, nut-ring, and valve-stem. Fig. 5 is a sectional plan view on the line $x\ x$, Fig. 1.

The ordinary gate-valve body, A, is provided on its inner recessed part, A', with the lugs B, placed diametrically opposite each other, one on each side, and with the vertical grooves or guideways C, which commence at the lugs B and run upward.

The gate D is made of two rings, D' and D², which are curved on their inner edges like a double screw-thread, each being provided on its side with a lug, E, sliding in its respective groove or guide C on the valve-body A. The face D³ of each ring is fitted accurately over a corresponding seat, A², formed on the valve-body A, in the usual manner. The rings D' and D² of the gate D are loosely fitted over the nut-ring F, provided on its top with a collar, F', having a square or hexagonal central opening, into which is fitted the nut G, cut in two parts and flanged on both ends. Into this nut screws the threaded part of the valve-stem H, provided with the fixed collar I, and having an annular recess, H', into which are fitted loosely the two halves of a collar or ring, J, around which is placed another ring, J', both rings J and J' resting on the annular projection A³ of the valve-body A. The stuffing-box K is screwed down on the packing between the rings J J' and stuffing-box K, so as to hold the rings firmly on the annular projection A³, at the same time allowing the turning of the valve-stem itself, in the usual manner.

The operation is as follows: The valve is closed by turning the valve-stem H, so that the nut G, the ring F, and the gate D travel downward. The parts D' and D² of the gate D are guided and prevented from turning by means of the lugs E, sliding in the guideways C, formed in the side of the recessed part A' of the valve-body A, and in this position they will remain until the valve is securely closed, when the ends of the lugs E come in contact with the lugs B, formed in the recessed part A' of the valve-body A, so as to force the parts D' and D² to revolve from each other in opposite directions by means of their curved inner edges pressing against each other, so as to firmly press the faces D³ of the gate D on the seats A² of the valve-body A. In starting to open the valve the lugs E on the sides of the gate D are at once brought against the sides of the guideways C by the turning of the valve-stem in the opposite direction to that before described, and thereby revolving the parts D' and D² toward each other until loosened from the seats A² of the valve-body. The gate is then free and moves upward with the ring F and the nut G by further turning of the valve-stem H.

Having thus fully described my invention,

I claim as new and desire to secure by Letters Patent—

The combination, with the valve body or casing having guiding-recesses and lugs at the bottoms of said recesses and a screw-stem seated for rotation in said body or casing, of the two-part gate, consisting of two rings provided on their inner edges with a double screw-thread-like curve, and each having a lug moving in a recess of the valve body or casing, the nut-ring fitting within said gate-rings and having an angular collar, within which is fitted a nut working upon said screw or stem, whereby, upon the lugs of the valve-rings reaching the lugs at the bottoms of the recesses of the valve-body or casing, and by continued movement of the screw or stem, the valve-rings will be revolved apart and their faces be packed tightly against their seats, substantially as set forth.

WILLIAM JACKSON.

Witnesses:
A. FRASER LEGGATE,
JAS. E. CREIGHTON.